UNITED STATES PATENT OFFICE.

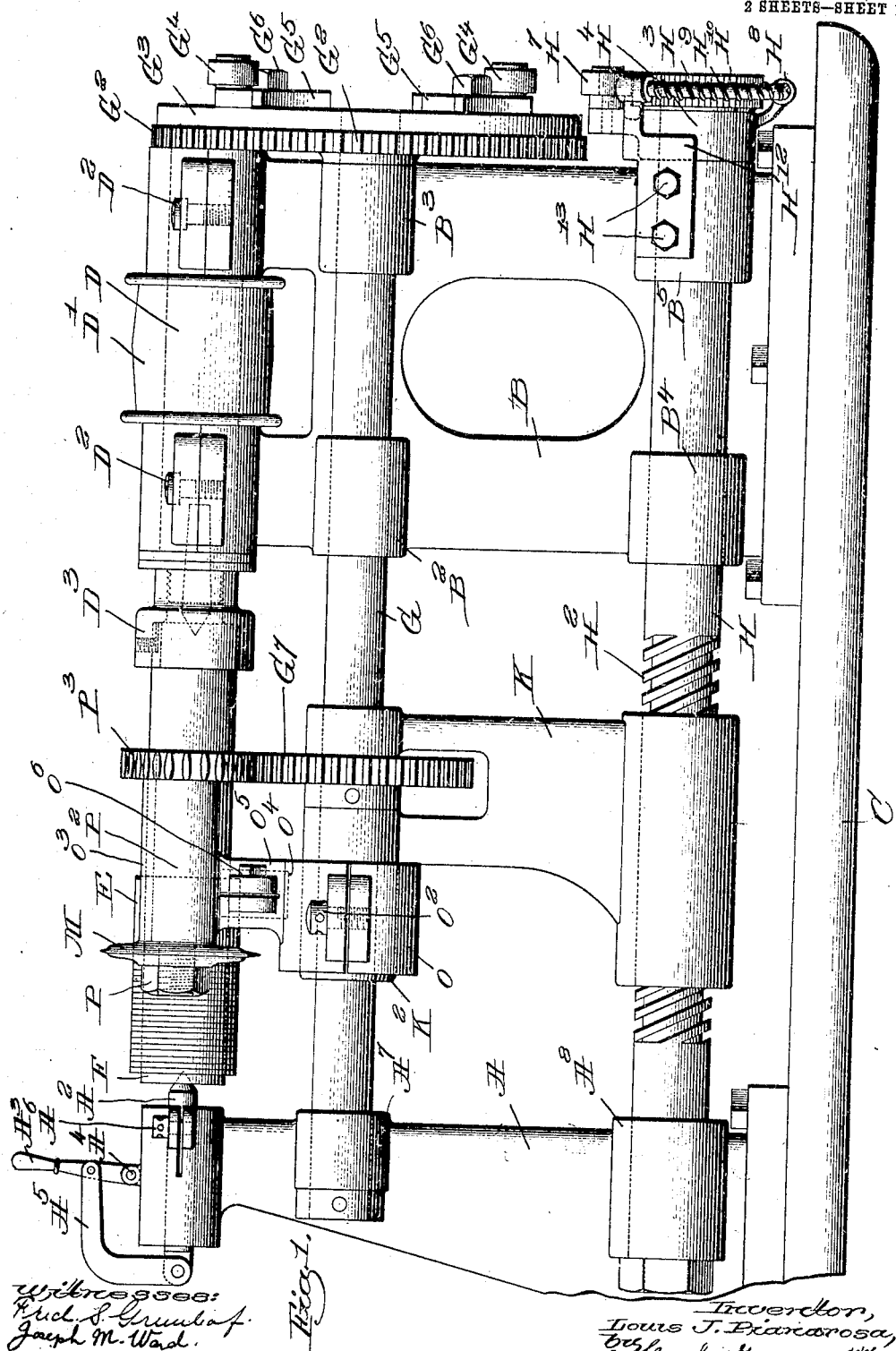

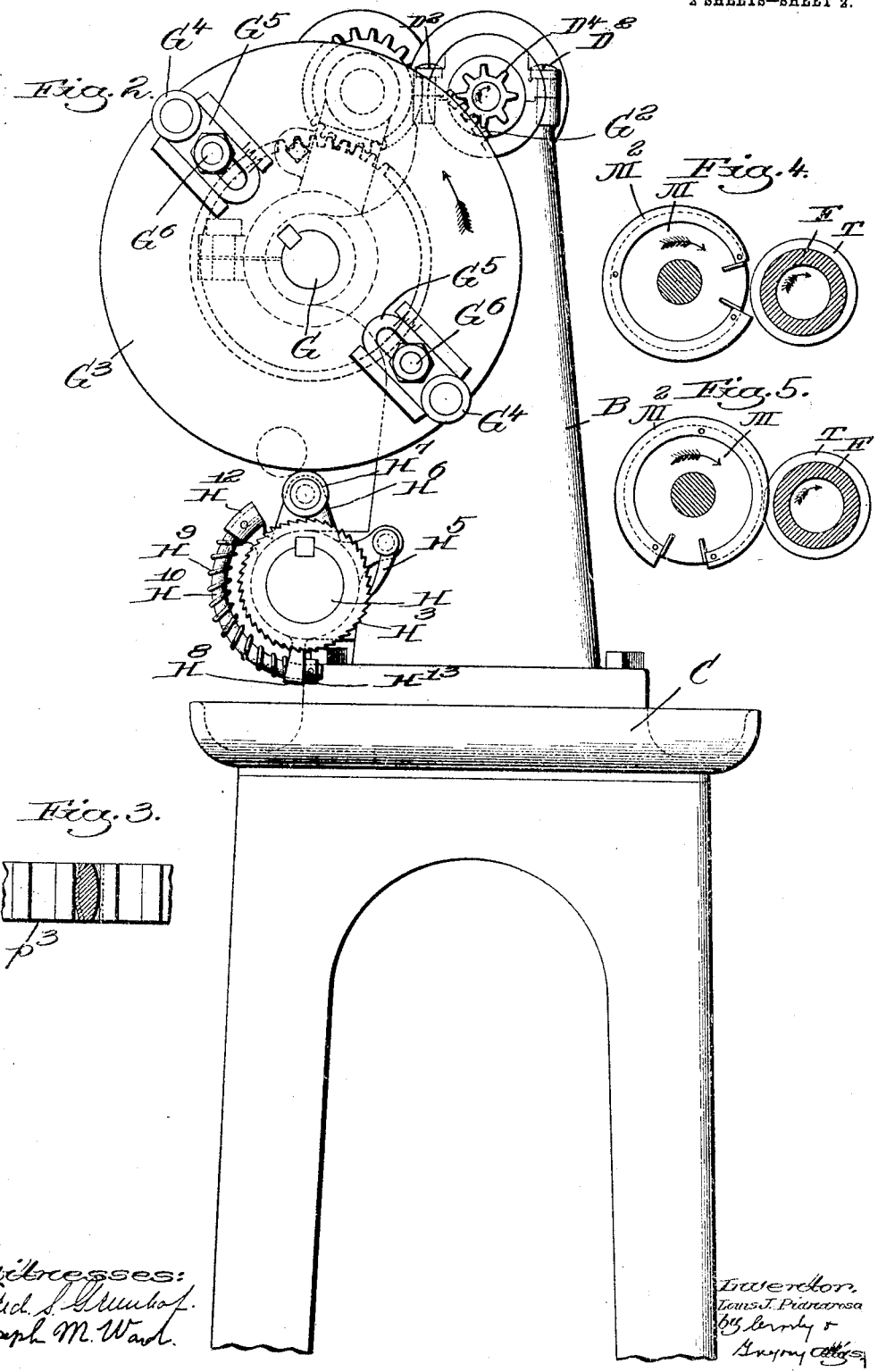

LOUIS J. PIANAROSA, OF BOSTON, MASSACHUSETTS.

MACHINE FOR CUTTING RUBBER RINGS.

No. 913,558.  Specification of Letters Patent.  Patented Feb. 23, 1909.

Application filed October 9, 1908. Serial No. 456,876.

*To all whom it may concern:*

Be it known that I, LOUIS J. PIANAROSA, a citizen of the United States, residing at Boston, in the county of Suffolk and State of Massachusetts, have invented an Improvement in Machines for Cutting Rubber Rings, of which the following description, in connection with the accompanying drawing, is a specification, like letters on the drawing representing like parts.

This invention relates to a machine for cutting rings from a tube of rubber or other material, and while the machine may be used for cutting rings of different material and for various purposes, it is particularly designed for the cutting of rubber rings, such as are used in the sealing of fruit jars.

It is the object of the invention to provide a machine which will perform the work entirely automatically in a rapid manner and leave the rings with smoothly cut surfaces.

An important feature of the invention resides in the rotary cutting knife which is constructed with an eccentric cutting edge, so that as the knife is rotated it gradually cuts deeper into the tube until the ring is severed therefrom. This construction of knife also enables the relative feeding movement between the tube to be cut and the knife to take place at that period of rotation of the knife when that portion of its edge of least eccentricity is adjacent to the tube, thus enabling the machine to be run at full and constant speed throughout its operation.

The nature of the invention and its novel features will more fully appear from the accompanying description and drawings and will be particularly pointed out in the claims.

The drawings illustrate a preferred form of a mechanism embodying the invention and designed for use in the cutting of fruit jar rings from a tube of rubber.

In the drawings, Figure 1 is a front elevation of the entire machine. Fig. 2 is an end elevation looking at the right-hand end of Fig. 1. Fig. 3 is a detail illustrating the construction of gear on the knife-shaft. Fig. 4 is a detail in cross-section showing the relative position of the eccentric knife-tube and mandrel at the time the relative feeding movement takes place. Fig. 5 is a view similar to Fig. 4, showing the position of the parts at one period of the cutting operation.

The machine includes a suitable frame, herein shown as made up of two separate standards A and B, adapted to be secured to the bed or table C, by bolts. These standards will be placed at a distance apart determined by the lengths of tube to be cut into rings, and for convenience in illustration are herein shown as close together.

The main shaft of the machine D is journaled in bearings in the upper portion of the standard B and carries a pulley D' by which it may be rotated from any suitable source of power. The bearings for the shaft D are split and fastened together by screws $D^2$ to permit the removal of the shaft.

The rubber tube to be cut, indicated at E, is supported in a close fit upon a mandrel F. The mandrel is driven from the main shaft D and is herein shown as driven directly therefrom, one end being held in a clutch $D^3$, forming the end of the shaft D, and the other end being centered upon a centering pin $A^2$, carried by the standard A in alinement with the shaft D.

The centering pin $A^2$ is movable longitudinally in the standard A by means of the lever $A^3$, pivoted at $A^4$ to the standard and connected by the link $A^5$ to the pin. This allows the ready removal and replacement of the mandrel. The centering pin is locked in position by the set-screw $A^6$.

A shaft G is mounted parallel to the shaft D in alined bearings $A^7$, $B^2$, $B^3$, in the standards A and B, and serves as a guide for the knife carriage and as a means for transmitting the power to the knife. This shaft is driven by a gear $G^2$, mounted thereon and intermeshing with a pinion $D^4$ on the shaft D. In the construction illustrated the relation of the gear to the pinion is as 6 to 1, so that the shaft G is rotated one-sixth times as fast as the shaft D.

A third shaft H is mounted parallel to the shafts G and D, in alined bearings $A^8$, $B^4$, and $B^5$, in the standards A and B, and serves as a second guide for the knife carriage, and also as a means for transmitting the feeding movement to the knife carriage by means to be described.

The knife carriage by which the knife is supported and moved transversely of the mandrel to give the relative feeding movement between the mandrel and the knife whereby the rings are cut one after another, is shown at K, and is guided upon and mounted to move longitudinally of the shafts G and H.

The feeding movement of the knife carriage is secured by forming the shaft H with a screw-threaded section $H^2$, fitting internal screw-threads in the knife-carriage K. At its outer end the shaft H is provided with a ratchet-wheel $H^3$. A pawl-carrier $H^4$ is journaled on the shaft H and carries a pawl $H^5$, engaging the teeth of the ratchet-wheel $H^3$. The pawl-carrier is provided with an arm $H^6$, carrying a roll $H^7$, which, when struck by a suitable striker, causes the partial rotation of the pawl-carrier and the consequent partial rotation of the shaft H, depending upon the distance that the arm $H^6$ is moved by the striker. The pawl-carrier is provided with a second arm $H^8$, engaging a compression spring $H^9$, sliding on a circular rod $H^{10}$, held fast at one end in an arm $H^{12}$, bolted at $H^{13}$ to the standard B. This spring thus serves as a buffer and as a means for returning the pawl $H^5$ to its normal position, a nut $H^{13}$ on the end of the rod $H^{10}$ serving to limit the return movement.

The strikers for operating the pawl-carrier are shown as mounted upon a disk $G^3$, carried on the end of the shaft G. These strikers comprise rolls $G^4$, carried by plates $G^5$, adjustable radially by means of set-screws $G^6$, upon the disk $G^3$, and it will be seen that the distance at which these strikers are set from the center of the disk will determine the distance through which the pawl-carrier is swung and consequently the distance the knife carriage is moved. Two sets of strikers are shown so that the knife carriage, in the construction illustrated, is given two feeding movements to each rotation of the shaft G.

The rotary cutting knife is shown at M, carried by a knife-support mounted on the knife carriage K. The knife-support is constructed to allow the adjustment of the knife bodily toward and from the mandrel, and also to allow of a slight angular adjustment of the knife to insure its correct position in a plane perpendicular to the axis of the mandrel. The knife support is, therefore, indicated as made in two sections. The section O fits over a projection $K^2$, of the knife carriage, and is rotarily adjustable thereon concentric with the shaft G so as to enable the knife M to be brought to the desired position with respect to the mandrel. For this purpose the section O is split and provided with a set-screw $O^2$, whereby it may be locked in position. The second section $O^3$ is formed with a pin or stud $O^4$, projecting at right angles to the stud $K^2$, and entering a split socket $O^5$ in the section O. This socket is provided with a set-screw $O^6$, thus allowing the section $O^3$ to be adjusted rotarily therein and locked in position to bring the knife M in the desired angular position with respect to the mandrel.

The knife M is locked by means of a set-screw P upon a shaft $P^2$. The shaft $P^2$ carries at its end a pinion $P^3$, engaging a gear $G^7$ on the shaft G, whereby rotary movement is imparted to the knife.

The pinion $P^3$ is formed with curved teeth, as illustrated in Fig. 3, to enable the angular adjustment of the knife to be made. The relation of the pinion $P^3$ to the gear $G^7$ in the construction illustrated is as 1 to 2, so that the knife is driven twice as fast as the shaft G is rotated.

The knife M is formed with its cutting edge eccentric to its center of rotation, so that the cutting edge penetrates gradually from the exterior of the tube to its interior in the cutting operation. The knife may be formed in various ways to secure this eccentricity, but as a preferred form of construction it may be made as illustrated in Figs. 4 and 5, wherein the edge is shown as a separate piece $M^2$, fastened onto the body portion of the knife and with a space between its ends.

The machine is assembled so that the strikers $G^4$ will operate to give the feeding movement to the knife carriage at the time when in its rotation that portion of the knife edge of least eccentricity is adjacent the tube carried by the mandrel, as indicated in Fig. 4, where F represents the mandrel and T the tube of rubber. The feeding movement will thus take place without interfering with the rotation of the knife and while there is no cutting action.

In Fig. 4 the action of the knife in cutting will be seen, the knife having penetrated part-way into the rubber tube T.

In the preferred form of construction described the arrangement of the gearing is such that the mandrel rotates three times to each rotation of the knife, and one ring is cut off at each rotation of the knife.

The operation of the machine will be apparent from the foregoing description. The centering pin $A^2$ is slid out by the lever $A^3$, the rubber tube to be cut is placed upon the mandrel F, which it fits snugly. The mandrel is placed in position and locked in the clutch $D^5$, the centering pin is slid back and locked by the set-screw $A^6$. The knife-support is swung upon the stud $K^2$ until that portion of the knife edge of least eccentricity is close up to the exterior of the tube, the knife-support is turned upon the stud $O^4$, if necessary, to bring the plane of the knife exactly perpendicular to the mandrel, and the parts are then locked in position by the set-screws $O^2$, $O^6$. The machine is then started by power applied to the pulley D and then proceeds to sever the rings automatically one after the other.

The terms "eccentric" and "eccentricity" as used in this description and the following claims, with respect to the rotary knife, are to be construed as applying to any form of edge, whether circular or irregular, which penetrates gradually from the exterior of the tube to its interior during the cutting operation.

Having described my invention, what I claim as new and desire to secure by Letters Patent, is:

1. A ring cutting machine, comprising a tube-supporting mandrel, a rotary knife having an eccentric cutting edge, means for rotating the knife, and means for giving a relative transverse feeding movement to the knife and mandrel during the rotation of the knife when that portion of its edge of least eccentricity is adjacent the tube.

2. A ring cutting machine, comprising a tube-supporting mandrel, a rotary knife having an eccentric cutting edge, means for rotating the knife, means for giving a relative transverse feeding movement to the knife and mandrel during the rotation of the knife when that portion of its edge of least eccentricity is adjacent the tube, and means for adjusting the extent of said transverse feeding movement.

3. A ring cutting machine, comprising a tube-supporting mandrel, means for rotating the said mandrel, a rotary knife having an eccentric cutting edge, means for rotating the knife, and means for giving a relative transverse feeding movement to the knife and mandrel during the rotation of the knife when that portion of its edge of least eccentricity is adjacent the tube.

4. A ring-cutting machine, comprising a tube-supporting mandrel, means for rotating the said mandrel in a direction opposite to the said knife and at a greater speed of rotation, a rotary knife having an eccentric cutting edge, means for rotating the knife, and means for giving a relative transverse feeding movement to the knife and mandrel during the rotation of the knife when that portion of its edge of least eccentricity is adjacent the tube.

5. A ring-cutting machine, comprising a tube-supporting mandrel, a rotary knife having an eccentric cutting edge, means for adjusting the knife bodily to bring its edge of least eccentricity close to the tube to be cut.

6. A ring-cutting machine, comprising a tube-supporting mandrel, a rotary knife having an eccentric cutting edge, means for adjusting the knife bodily to bring its edge of least eccentricity close to the tube to be cut, means for adjusting the knife angularly with respect to said mandrel.

7. A ring-cutting machine, comprising a tube-supporting mandrel, a rotary knife having an eccentric cutting edge, means for rotating the knife, and means for giving a transverse feeding movement to the knife longitudinally of the mandrel during the rotation of the knife when that portion of its edge of least eccentricity is adjacent the tube.

8. A ring-cutting machine, comprising a tube-supporting mandrel, a carriage mounted adjacent to and movable parallel to said mandrel, a knife-support mounted on said carriage, a rotary knife mounted in said support, means for rotating said knife, means for giving a feeding movement to said carriage during the rotation of the knife when that portion of its edge of least eccentricity is adjacent the tube.

9. A ring-cutting machine, comprising a tube-supporting mandrel, a carriage mounted adjacent to and movable parallel to said mandrel, a knife-support mounted on said carriage, a rotary knife mounted in said support, means for adjusting said support on said carriage to carry the knife toward and from the mandrel, and means for rotating said knife.

10. A ring-cutting machine, comprising a tube-supporting mandrel, a carriage mounted adjacent to and movable parallel to said mandrel, a knife-support mounted on said carriage, a rotary knife in said support, means for adjusting said support on said carriage to carry the knife toward and from the mandrel. means for adjusting the said support on the said carriage angularly with respect to the said mandrel, and means for rotating said knife.

11. A ring-cutting machine, comprising a frame, a tube-supporting mandrel carried by said frame, a knife supporting carriage mounted on said frame to move parallel with the mandrel, a shaft journaled in said frame parallel to the said mandrel and having screw-threaded engagement with said carriage, a rotary knife supported from said carriage, a second shaft mounted in said frame and having driving connections with said knife, a pawl-and-ratchet mechanism mounted on said first shaft, a striker carried by said second shaft and adapted to operate said pawl-and-ratchet mechanism upon the rotation of the second shaft.

In testimony whereof, I have signed my name to this specification, in the presence of two subscribing witnesses.

LOUIS J. PIANAROSA.

Witnesses:
MABEL PARTELOW,
FREDERICK S. GREENLEAF.